Dec. 2, 1969  B. F. SUMMEROUR  3,481,103
METHOD AND APPARATUS FOR ALIGNING AND
DEPOSITING EGGS ONTO EGG FLATS
Filed Feb. 21, 1967  3 Sheets-Sheet 2

Benjamin F. Summerour
INVENTOR.

BY *Clarence A. O'Brien*
*and Harvey B. Jacobson*
Attorneys

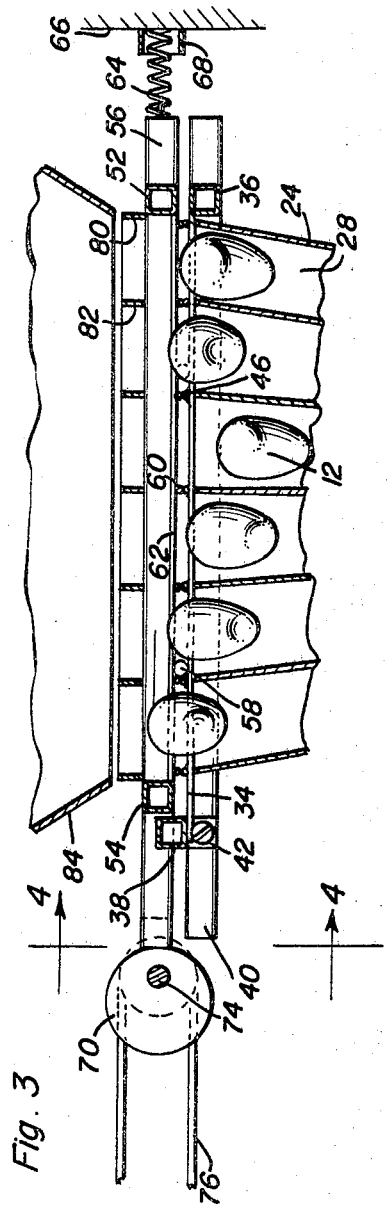
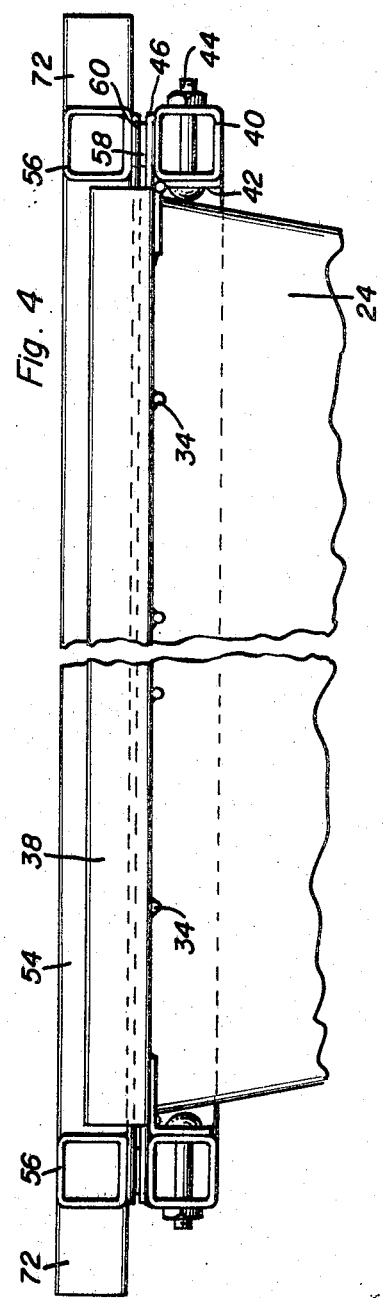
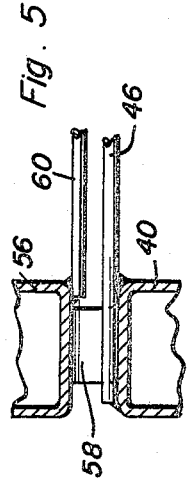
Benjamin F. Summerour
INVENTOR.

United States Patent Office 3,481,103
Patented Dec. 2, 1969

3,481,103
METHOD AND APPARATUS FOR ALIGNING AND DEPOSITING EGGS ONTO EGG FLATS
Benjamin F. Summerour, 237 N. Peachtree St.,
Norcross, Ga. 30071
Filed Feb. 21, 1967, Ser. No. 617,578
Int. Cl. B65b 23/06
U.S. Cl. 53—35                                    7 Claims

ABSTRACT OF THE DISCLOSURE

A device for handling eggs so that eggs may be aligned and deposited on egg flats with the small ends thereof disposed downwardly operating on the principle that a fresh egg when submerged in water will tilt with its small end downwardly so that as it falls through water of a predetermined depth through a suitable guide, all of the eggs will be arranged with the small end down inasmuch as the center of gravity of the egg will be disposed nearer the small end thereof. The aligning device includes a plurality of tubular guide members disposed in a pattern corresponding to the pattern of recesses or sockets in an egg flat so that eggs discharged from the lower ends of the guide will be properly aligned and placed on an egg flat. The guide structures are provided with entrance gates such that entry of eggs into the guide structures will be controlled submerged below water surface so that the eggs will sink and change in orientation from a general horizontal position to a vertical position due to the relationship of the center of gravity of the egg to the small end of the egg.

---

An object of the present invention is to provide an aligning device for eggs for use in orienting and arranging eggs for placement on an egg flat with all of the small ends disposed downwardly.

The present invention has for an object the provision of a device for aligning eggs which employs the well-known phenomena that fresh eggs when placed in water will tilt so that the small end thereof is downward in relation to the large end thereof and combining this phenomena with a guide tube structure so that as the eggs sink in water in the guide tubes, they will be arranged vertically and aligned with the sockets or recesses in the upper surface of an egg flat so that they may be deposited on the egg flat and subsequently conveyed to the next stage in the egg handling procedure.

Still another object of the present invention is to provide an aligning device for eggs which is simple in operation, inexpensive to manufacture and simple to maintain and may be either manually operated or power operated and provides for loading of the flats in a much more rapid and efficient manner than when loading flats by hand. The aligning device saves considerable labor and enables one operator to handle a much larger flock of laying hens inasmuch as it reduces substantially the time normally consumed in placing the eggs, small end down on an egg flat.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 3 is a partial sectional view similar to FIGURE 2 but illustrating the control gate structure at the upper end of the aligning device open to enable the group of eggs to sink through the aligning device toward the egg flat;

FIGURE 4 is a detailed sectional view taken substantially upon a plane passing along section line 4—4 of FIGURE 3 illustrating the structural relationship of the components of the above invention;

FIGURE 5 is a detailed fragmental view illustrating further structural details of the components of the invention; and FIGURE 6 is a perspective view illustrating one of the guide tubes for the eggs as they sink toward the egg flat.

Figure 1:
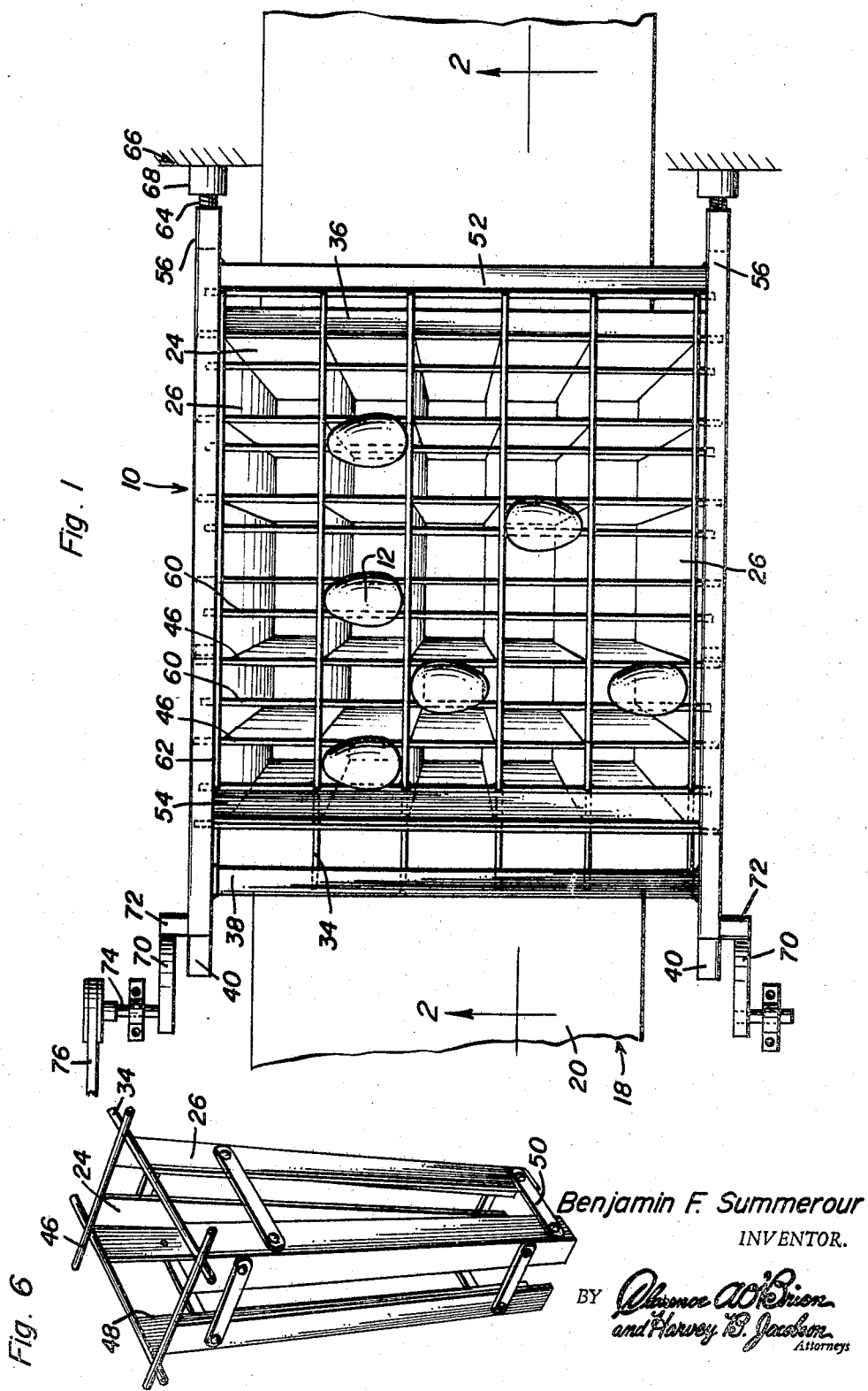
FIGURE 1 is a top plan view of the egg aligning device of the present invention.

Referring now specifically to the drawings, the numeral 10 generally designates the egg aligning device of the present invention which is employed for aligning eggs 12 with the sockets or recesses 14 in the upper surface of an egg flat 16 so that the eggs 12 will be placed on the flat in a vertical orientation with the small end down which is the desired manner of placing the eggs on the egg flats and this is usually accomplished by an operator manually picking up the eggs and placing them, small end down, on the egg flat.

The egg flat 16 is disposed in underlying relation to the aligning device and is schematically illustrated as being supported on a conveyor structure generally designated by the numeral 18 and including a conveyor belt 20 supported by suitable rollers 22 or the like with it being pointed out that the conveyor is of conventional construction and forms no particular part of the present invention and any suitable mechanism either manual or automatic may be provided for stopping the conveyor 18 so that the flat 16 is in alignment with the aligning device 10. In lieu of this, the operator may place the flat 16 on the conveyor belt 20 in alignment with the aligning device 10 of the present invention and after the eggs have been properly positioned on the egg flat 16, he may cause the conveyor 18 to be operated in any suitable manner so that the loaded egg flat may then be conveyed to the next stage in the egg handling operation.

The egg aligning device includes a structure in the form of a guide assembly having a plurality of transversely extending wall structures 24 and longitudinally extending wall structures 26 disposed in intersecting perpendicular relation to define a plurality of tubular guides or passages 28. The walls or partitions 24 and 26 converge downwardly toward each other so that the guide tubes or passages 28 also converge with the lower edge 30 of the guide assembly thus forming a plurality of discharge areas 32 directly in alignment with the recesses or sockets 14 in the upper surface of a flat 16 disposed in alignment with the lower end of the aligning device. Thus, the peripheral dimensions of the lower end of the guide tubes or passages 28 is substantially the same as the egg flat and the recesses or sockets 14 are aligned with the discharge lower ends 32 of the tubular guides or passages 28 so that the eggs 12 will discharge into the sockets or recesses 14. As illustrated, the lower edge 30 of the aligning device is spaced sufficiently from the egg flat 16 so that the egg flat and the eggs 12 thereon may be conveyed laterally of the lower end 30 of the walls 24 without breakage of the eggs.

The upper ends of the walls 24 and 26 are connected with longitudinally extending wires 34 which are secured to the frame member 36 at one end thereof in flush relation to the top surface thereof and are secured to the undersurface of a transverse frame member 38 at the other end thereof. The frame member 36 is secured flush with longitudinal frame members 40 while the frame member 38 is secured to the other ends of the frame members 40 by virtue of a downwardly extending lug 42 and a fastener 44 thus orientating the frame member 38 above the frame members 40. Disposed above the longitudinal rods 34 and in intersecting relation thereto is a plurality of transverse rods 46 which extend across the longitudinal rods 34 and extend across and are secured to the top surface of the longitudinal frame members 40 with the transverse rods 46 being aligned with the top edges of the transverse walls 24 to form a portion of an entrance gate for the eggs 12 in a manner described hereinafter. Also, the longitudinal rods 34 are in alignment with the longitudinal walls 26 and serve to rigidify the structure of the walls.

As illustrated in FIGURE 6, the walls may be each formed with a longitudinal slot 48 extending from one end thereof to the other so that, in effect, none of the walls are continuous and thus, the flanges which define the edges of the slot 48 are interconnected by the wire rods 34 in one instance and could also be connected to the wire rods 46 with the lower ends thereof being provided with connecting strips such as at 50 thereby enabling the tubular guides 28 to be individually formed of four right angular members which converge in relation to each other and with each of the tubular guide passages 28 also converging downwardly towards the center tubular guides.

Figure 2:
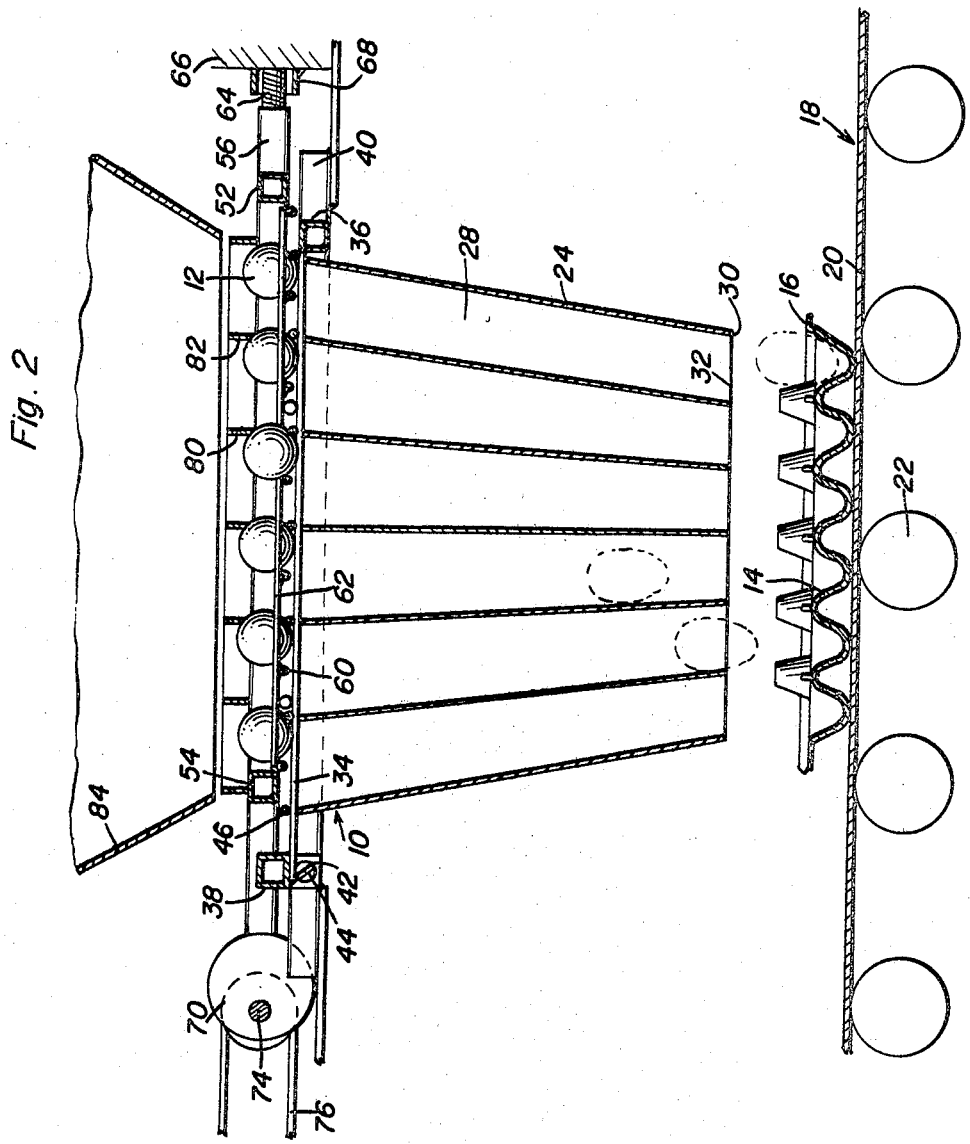
FIGURE 2 is a longitudinal sectional view taken substantially upon a plane passing along section line 2—2 of FIGURE 1 illustrating the relationship of the aligning device to the egg flat.

As is conventional, each egg flat is arranged to receive 30 eggs with the eggs being arranged in five rows with six eggs in each row. A corresponding number of tubular guides will be provided and the particular manner of supporting the tubular guides from the peripheral framework may vary as may the material from which the tubular guides are constructed. For example, sheet metal may be employed but also other materials may be employed such as plastic or the like with the tubular guides being of sufficient dimension at the upper end thereof to receive an egg 12 when disposed horizontally with the dimension of the tubular guide decreasing so at the lower end thereof such as the discharge end 32, the dimensions are such that in order for the egg to pass therethrough, it will be in a vertical or substantially vertical position as illustrated in FIGURE 2.

The valving structure or entrance gate for the upper ends of the passages is completed by a second peripheral frame including transverse frame members 52 and 54 which are in the same horizontal plane and longitudinal frame members 56 which are in the same horizontal plane as the transverse members 52 and 54. The longitudinal frame members 56 overlie the longitudinal frame members 40 and are supported thereby by a pair of cylindrical projections 58 on each longitudinal frame member 40 to facilitate sliding movement of the frame members 56 in relation to the frame members 40.

Interconnecting the longitudinal frame members 56 is a plurality of transverse rods 60 which are secured to the lower surface thereof and which are parallel with the transverse rods 46 and spaced slightly above the upper surface of the rods 46. Interconnecting the transverse frame members 52 and 54 is a plurality of longitudinal rods 62 which are connected to the transverse frame members 52 in intersecting relation to the transverse rods 60 and the rods 62 may also be rigidly connected to the rods 60 thus defining rectangular openings corresponding to the rectangular openings defined by the intersecting rods 34 and 46.

When the transverse rods 60 interconnecting the frame members 56 are in alignment with the transverse rods 46 interconnecting the longitudinal frame members 40, the rectangular openings defined by the transverse rods and longitudinal rods are in alignment with each other so that eggs 12 disposed with their longitudinal axes horizontally may drop downwardly through such aligned openings into the tubular passageways or guides defined by the wall 24 and 26. In the other position of the upper set of transverse rods 60, the rods 60 will be located intermediate the rods 46 as illustrated in FIGURE 2 so that the space between an upper rod 60 and a lower rod 46 will be inadequate to permit passage of an egg 12 thus supporting the eggs 12 in the position illustrated in FIGURE 2.

A spring 64 is interposed between one end of the longitudinal frame member 56 and a stationary support 66 and a suitable guide 68 may be provided for the spring with the spring serving to urge the upper frame members and the upper transverse rods 60 toward a position in alignment with the lower transverse rods 46. The arrangement of the transverse frame member 38 being above the longitudinal frame members 40 places it in the path of movement of the transverse frame member 54 so that when the upper frame members move away from the stationary support 66, the transverse frame member 54 will come into stopping engagement with the transverse frame member 38 thus automatically aligning the upper transverse rods 60 with the lower transverse rods 46. A cam 70 is provided for moving the upper frame members into position with the upper transverse rods 60 misaligned with respect to the lower transverse rods 46 as illustrated in FIGURE 2. The cam engages a laterally extending follower 72 on each longitudinal frame member 56 so that when the cam 70 has the high point thereof engaged with the follower 72, the condition as illustrated in FIGURE 2 will be accomplished. The cam 70 may be provided on both sides of the upper frame to engage followers on both of the longitudinal frame members 56. The cam or cams 70 are mounted on shaft 74 and such shaft may be either driven through a drive belt, chain or the like 76 or a manual hand crank may be provided either of the shafts 74. Thus, the cams 70 may be both driven or both manually operated or only a single cam may be provided which may be either manually driven or powered or one cam may be powered and one manually operated to enable accurate and selective control of the position of the entrance gate assembly which controls entry of eggs into the tubular guide passages 28.

In the construction of the tubular guides or cells, the top dimension is rectangular and a three inch by a two and one-quarter inch dimension has been found adequate whereas the bottom dimension or lower end of each tubular guide or cell is square and a square having an internal dimension of one and fifteen-sixteenths inches has been found adequate. The open gaps or slots defined in each tubular guide or cell which is on all four sides of each cell is significant in the operation of the device in that it performs two functions while each egg is confined in its cell. First, the gaps or slots provide more freedom for easier turning of the eggs on their center of gravity as they sink slowly through the water. Second, the slots or gaps give the eggs jostling room as they come tight toward one another at the bottom of the cells and settle into their pockets in the egg flat. As is well known, eggs vary considerably in size and for the extra large eggs, the gaps or slots are all the more important in that these slots allow an extra large egg to be partially received into the area of an adjacent cell where this is necessary without disturbing the movement of the egg in the adjacent cell to any appreciable degree.

The egg flat is of conventional construction and actually supports the eggs at four different points and will maintain the egg in a vertical position once the egg has settled onto the flat. While some flats are made of cardboard material, the flats may also be constructed of waterproof material such as plastic or the like which are preferably in this type of operation inasmuch as the entire egg aligning device is submerged below the water surface. The submergence of all of the aligning device below a water surface enables the eggs to be placed more expeditiously in a guide structure 80 having cells 82 therein corresponding with those defined by the longitudinal rods 62 and transverse rods 60. The guide structure 80 fixedly solidly on frame members 56 provides for hand operation with the eggs being placed in parallel position which is manually accomplished by gently stirring the submerged eggs to a single layer with each cell 82 receiving one egg with any surplus eggs then being pushed off the top of the guide structure 80. The guide structure 80 and the single layer of eggs resting therein will move with the upper frame member so that this single layer of eggs is released when the upper frame member is moved so that the transverse rods 60 are brought into alignment with the transverse rods 46 with the supporting edges defined by the transverse rods 46 and 60 moving apart to release the eggs for passage into passages 28 without breakage of the eggs.

Any suitable and adequate conveying device commonly used in the egg producing industry for conveying eggs may be provided for conveying eggs to the pockets formed by the transverse rods and also conveying the filled flats to the next subsequent stage of the egg producing procedure. The entire structure may be supported in any suitable manner and if desired, a hopper-like structure 84 may be provided for retaining the eggs generally in position for alignment with the cells and a circulating pump may be provided for circulating water upwardly which will tend to keep the eggs floating in the hopper and in the cells to enable the eggs to be properly orientated in the cells or pockets at a depth of one layer of eggs.

Eggs are generally oblong in shape, with one end blunt and larger than the other sharper and smaller end. There is a considerable variation in their shapes, with an occasional egg the same as spherical. All eggs have an air-cell which is in the larger blunt end of the normally shaped egg. The specific gravity of the air-cell area of an egg is less than water, hence such area in the water tends to float. The overall contents of all fresh eggs have a specific gravity greater than water, and as a unit, the eggs will sink in the water. This imbalance in specific gravity causes the egg cell area to tend to float or rise to the surface of the water, and the opposing end, or side, to sink. Thus, we have a turning of the egg on its center of gravity, with the air-cell coming to the top vertical position as the egg comes to rest in its socket or recess.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A dvice for aligning eggs with recesses on an egg flat with the small end of the egg facing downwardly comprising a vertically disposed tubular guide having an upper end for receiving an egg and a lower end for discharging an egg with the cross-sectional area thereof diminishing toward the bottom to a size capable of discharging an egg only when the longitudinal axis of the egg generally is disposed substantially vertically, gate means at the upper end of the tubular guide for supporting an egg from opposed supporting surfaces and releasing the egg into the tubular guide by moving the surfaces apart thereby tilting the egg with the small end thereof down, and a quantity of water fully submerging the guide for further tilting and retaining the egg with the smaller end disposed downwardly of the larger end as the egg sinks through the water due to the location of the center of gravity of the egg in relation to the geometric center thereof.

2. The structure as defined in claim 1 together with a plurality of said tubular guides arranged in a pattern with the discharge ends thereof corresponding with the pattern of the recesses in an egg flat, said guides converging toward each other downwardly to enable simultaneous placement of eggs in the upper ends thereof with the eggs having their longitudinal axes disposed in horizontal orientation.

3. The structure as defined in claim 2 wherein each tubular guide has longitudinal slit means in the periphery thereof communicating with adjacent guides to enable eggs to jostle in relation to each other and in relation to adjacent guide areas for alignment with the recesses in the egg flat.

4. The structure as defined in claim 2 wherein said tubular guides are provided with said gate means at the upper ends thereof for supporting a single layer of eggs arranged in the same pattern as the upper end of the guides, and means shifting the entrance gate means from a position for supporting the layer of horizontal eggs to a position releasing the eggs with the releasing operation including edge surfaces which move apart thus serving to support the large ends of the eggs slightly later than the small ends thereof thus starting the egg in its tilting movement as it is released.

5. The structure as defined in claim 4 wherein said entrance gate means includes a stationary set of transversely extending and longitudinally extending wire rods defining a wire grid with a plurality of rectangular openings defined thereby, and a movable gridwork of transversely and longitudinally extending wire rods defining similar openings for selective alignment and misalignment with the openings defined by the movable wire grid, the parallel wire rods engaging the opposed surfaces of the eggs serving to support the eggs as the wire rods move apart so that the small end thereof commences downward movement prior to the large end thereof.

6. The method of orienting eggs with the small end thereof below the large air cell end thereof consisting of the steps of placing an egg on a pair of spaced parallel supports with the longitudinal axis of the egg generally paralleling the supports, moving the supports apart to cause tilting of the egg about a generally transverse axis oriented at the maximum diameter of the egg normally closer to the end of the egg having an air cell therein, depositing the tilted egg into a body of water, permitting the egg to sink slowly through the water due to force of gravity with the air cell end of the egg having a lower specific density thus causing the egg to assume a vertical position, guiding the egg loosely to permit tilting thereof during the sinking movement thereby orienting the egg with the small end thereof below the large end.

7. The method as defined in claim 6 together with the step of aligning the egg with an egg flat for placing the egg on the egg flat with the small end downward.

References Cited

UNITED STATES PATENTS

| | | | |
|---|---|---|---|
| 899,760 | 9/1908 | Remington | 53—247 X |
| 2,650,746 | 9/1953 | Rideout et al. | 53—166 |
| 3,126,993 | 3/1964 | Van der Schoot | 193—43 |
| 3,178,867 | 4/1965 | Martin | 53—248 |

FOREIGN PATENTS

| | | |
|---|---|---|
| 893,744 | 10/1953 | Germany. |

THERON E. CONDON, Primary Examiner

R. L. SPRUILL, Assistant Examiner

U.S. Cl. X.R.

53—166, 248